United States Patent [19]
Treffner et al.

[11] 3,839,057
[45] Oct. 1, 1974

[54] BURNED BASIC PHOSPHATE-BONDED REFRACTORY BRICK

[75] Inventors: Walter S. Treffner, Linthicum Heights; Alfred H. Foessel, Baltimore, both of Md.

[73] Assignee: General Refractories Company, Philadelphia, Pa.

[22] Filed: July 28, 1971

[21] Appl. No.: 167,049

[52] U.S. Cl. .................................. 106/58, 106/59
[51] Int. Cl. ...................... C04b 35/04, C04b 35/42
[58] Field of Search ............................ 106/58, 59

[56] References Cited
UNITED STATES PATENTS

| | | | |
|---|---|---|---|
| 3,390,002 | 6/1968 | Davies et al. | 106/58 |
| 3,449,138 | 6/1969 | Davies et al. | 106/58 |
| 3,479,194 | 11/1969 | Davies et al. | 106/58 |
| 3,522,063 | 7/1970 | Treffner et al. | 106/58 |
| 3,615,777 | 10/1971 | Davies et al. | 106/59 |

FOREIGN PATENTS OR APPLICATIONS
717,217   12/1968   Belgium ............................... 106/58

Primary Examiner—James E. Poer
Attorney, Agent, or Firm—Finnegan, Henderson, Farabow & Garrett

[57] ABSTRACT

Phosphate-bonded basic refractory compositions containing the following compounds in predetermined ratios--$CaO:SiO_2$; $P_2O_5:SiO_2$; $P_2O_5:CaO$ and $CaO:(P_2O_5+SiO_2)$ are fired at temperatures from 2,500° to 3,200°F to provide improvements in dimensional stability on firing, improved hot compressive and transverse load resistance, improved compressive creep behavior, or improved thermal spalling resistance. In another embodiment, low silica chrome ore is also included in the phosphate-bonded basic refractory composition which is subjected to firing to improve one or more of the above described properties.

8 Claims, No Drawings

BURNED BASIC PHOSPHATE-BONDED REFRACTORY BRICK

This invention relates to processes for making basic, magnesia-containing refractory shapes. More particularly, the invention relates to an improved process for producing refractory shapes, such as bricks, which possess unusual and unexpectedly desirable properties by firing certain phosphate-bonded basic refractory compositions.

There are two common techniques used in making basic, magnesia-containing refractory shapes such as bricks. One technique is called direct bonding and involves pressing a refractory composition and then firing the composition at elevated temperatures to sinter the particles in the composition and produce ceramic bonding. The direct bonded brick of present commercial utility is usually fired at very high temperatures, in excess of 3,200°F, which constitutes an expensive process step.

The second technique for making basic, magnesia-containing refractory shapes produces "chemically-bonded" brick. Such a brick is installed, for example in a furnace, in the unburned state. Eventually, in use, the composition may become subjected to temperatures at which a ceramic bond is achieved by sintering of the particles. The strength of the composition before achieving the ceramic bond is provided by a "chemical" bond formed by the addition of a material which reacts with the magnesia portion of the composition at low to moderate temperatures. Materials like sulfates (e.g., magnesium sulfate, acid sulfates and sulfuric acid); chromates (e.g., chromium salts and chromic acid) silicates (e.g., alkali silicates); chlorides and hydraulic cements and phosphates have been used as chemical binders.

In U.S. Pat. No. 3,522,063, for "Phosphate-Bonded Basic Refractory Composition," there are described improved compositions for chemically-bonded basic, magnesia-containing refractory shapes. This patent teaches that when dead-burned low silica magnesite, sodium polyphosphate, and a calcium compound (and optionally low silica chrome ore), are mixed in certain proportions, it is possible to produce a chemically-bonded basic refractory composition having in the unfired condition, improved hot bending and compressive strengths.

The patent specifically teaches compositions that possess excellent strength properties at "intermediate" temperature ranges of 2,000°–2,700°F.

The unique compositions and processes described in U.S. Pat. No. 3,522,063 produce chemically-bonded magnesite and magnesite-chrome brick of unusually high modulus of rupture at elevated temperatures. The very high hot modulus strength of the patented composition has proven to be an asset in a variety of end-use applications in the refractories industry. However, in certain other applications, hot modulus strength may not necessarily be the primary criterion and other properties are equally important, such as hot compressive and transverse load resistance, compressive creep resistance, and thermal spalling resistance.

Unburned brick possesses some inherent disadvantages when used under a temperature gradient. For example, during use chemically-bonded brick may be exposed to chemical and temperature gradients which could cause both detrimental physical and chemical changes in the brick.

Accordingly, the present invention provides basic magnesia-containing refractory shapes having a uniform structure when exposed to a temperature gradient. Unusual and unexpected properties are achieved when chemically-bonded compositions made according to U.S. Pat. No. 3,522,063 are fired at temperatures of 2,500° to 3,200°F.

The invention in one embodiment thus comprises an improvement in a process for making a basic refractory shape in which (a) calcined magnesite having a silica content below 0.7%; (b) a calcium compound selected from the group consisting of calcium carbonate and a hydraulic cement; (c) a sodium polyphosphate having the formula:

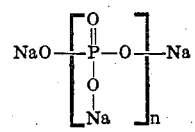

where $n$ is an integer from 4 to 100; and (d) low silica chrome ore in an amount up to 40% by weight, thereof based on the combined weight thereof with said calcined magnesite, in proportions to provide, in said mixture, a $SiO_2$ content below 1% and a $CaO:SiO_2$ ratio of at least about 4.5:1, said calcium compound and said sodium polyphosphate each being present in an amount of from about 1% to about 10% by weight, based on the weight of the composition, are mixed and then formed under pressure into a refractory shape. The improvement comprises firing the brick at a temperature of 2,500° to 3,200°F to provide improved hot compressive load deformation properties.

In another embodiment, the invention provides an improvement in a process for making a basic refractory shape in which (a) calcined magnesite having a silica content below 0.7%; (b) a calcium compound selected from the group consisting of calcium carbonate and a hydraulic cement; and (c) a sodium polyphosphate having the formula:

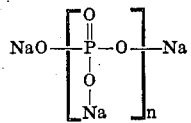

where $n$ is an integer from 4 to 100, in proportions to provide, in the resulting mixture, a $SiO_2$ content below 0.7%, a $CaO:SiO_2$ ratio of at least about 4.5:1, a $P_2O_5:SiO_2$ ratio of from about 3:1 to about 12:1, a $P_2O_5:CaO$ ratio of from about 0.6:1 to about 1.2:1, and a $CaO:(P_2O_5 + SiO_2)$ ratio of from about 0.8:1 to about 1.3:1, said calcium compound and said sodium polyphosphate each being present in an amount of from about 1% to about 10% by weight, based on the weight of the composition, are mixed and then formed under pressure into a refractory shape. The improvement comprises firing the refractory shape at a temperature of 2,500° to 3,200° F to provide improved hot compressive load deformation properties.

Unusual and unexpected properties are achieved when chemically bonded brick of the compositions set forth above are burned at various temperatures. All brick produced by firing the chemically-bonded compositions possesses unusual dimensional stability on firing. In fact, by correlating the refractory composition and particularly MgO content with the selected firing temperature, no dimensional changes will result from the firing treatment. Little, if any, densification or vitrification takes place on firing to impair the spalling resistance of the burned product.

Similarly, the porosity of the fired brick changes relatively little with an increase of firing temperature for a given composition. This indicates that little change in porosity occurs in a fired brick which is later subjected to a temperature gradient condition.

Most unexpectedly and importantly, the resistance of the brick against hot compressive load deformation increases significantly with one firing. With increasing firing temperatures, hot compressive load deformation properties can be obtained which are superior to those of so-called directbonded basic refractories on the market today. Superior long-time (creep) behavior under compressive load can also be provided as compared to commercially direct-bonded brick, although the difference is not as marked.

With the improvements described above, a concurrent decrease in hot modulus and compressive fracture strength occurs from the very high values cited in U.S. Pat. No. 3,522,063 for chemically-bonded brick. However, hot modulus strengths at 2,700°F after burning usually still exceed those obtained on so-called direct-bonded brick.

Another feature of the improved process of the invention is the capability of manufacturing shaped basic refractories by burning the specific chemically-bonded composition at conventional to subconventional temperatures and achieving properties which are about equal to, or superior to those obtained for so-called direct-bonded brick that is commercially produced by firing at high to extra-high temperatures.

It is to be understood that both the foregoing general description and the following detailed description are exemplary and explanatory, but are not restrictive of the invention.

In accordance with the invention, dead-burned low silica magnesite, a sodium polyphosphate and a calcium compound, and optionally a low silica chrome ore, are mixed in specific proportions to produce a chemically-bonded basic refractory composition. Subsequently, the refractory composition is shaped and fired at temperatures of from 2,500° to 3,200°F to provide unexpectedly improved hot compressive and transverse load resistance, improved compressive creep behavior and thermal spalling resistance.

The basic refractory compositions which can be fired in accordance with the present invention are those disclosed in U.S. Pat. No. 3,522,063, the disclosure of which is incorporated herein by reference.

Generally, the compositions are prepared from materials selected in proportion to provide relationships among the CaO, $SiO_2$, and $P_2O_5$ contents within certain ranges. The total content of $SiO_2$ in the composition is kept low.

In one main embodiment, the composition consists essentially of: (a) calcined magnesite having a silica content below 0.7%; (b) a calcium compound, and (c) a sodium polyphosphate having the formula:

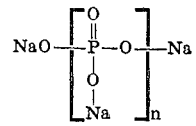

where $n$ is an integer from 4 to 100. The composition has an $SiO_2$ content below 0.7%; a $CaO:SiO_2$ ratio of at least about 4.5:1, a $P_2O_5:SiO_2$ ratio of from 3:1 to 12:1, a $P_2O_5:CaO$ ratio of from 0.6:1 to 1.2:1, and a $CaO:(P_2O_5 + SiO_2)$ ratio of from 0.8:1 to 1.3:1. In the preferred compositions the $SiO_2$ content is below 0.5%, and the value for $n$ is from about 10 to about 30.

The magnesia source employed in the composition is a calcined magnesite of low silica content, that is a silica content below 0.7%. Otherwise, the calcined magnesite need not be of high purity. A typical calcined magnesite found to be particularly suitable has the following average analysis:

|  | Percent |
| --- | --- |
| MgO | 91–92 |
| $SiO_2$ | 0.3 |
| CaO | 2.7 |
| Oxides of Fe, Al, Mn, etc. | 5 |

The initial magnesite is calcined to convert the magnesium carbonate to magnesium oxide. The magnesite preferably is dead-burned by calcining at temperatures above about 2,700°F.

The calcined magnesite is the principal aggregate of the present composition. As is well known and conventional in compositions of this type, the particle size, and particle size distribution, may vary depending in part at least upon the partciular mode in which the composition is to be used. Generally, it is desirable to have a combination of relatively coarse particles, and relatively fine particles, as from about 20 to about 90%, by weight, of coarse particles and the balance (from about 80 to about 10%) of the fine particles. Coarse fractions generally have a particle size of −2 +48 mesh, and the fine fraction is somewhat finer than the coarse particles and is generally −28 mesh, and preferably −48 mesh. A typical grain sizing particularly suitable for brickmaking operations is about 60% −6 +35 mesh and about 40% −48 mesh. Mesh sizes herein refer to Tyler mesh series.

The principal chemical binder employed in the composition is a sodium polyphosphate having the formula:

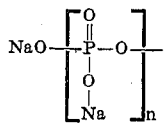

where $n$ is from 4 to 100. These are amorphous glasses and are available in powder form. The $n$ actually represents an average chain length. In the preferred sodium polyphosphates, $n$ is from about 10 to about 30. Such sodium polyphosphates produce neutral to alkaline aqueous compositions; that is, they will have a pH in water of 6.5 and higher. An especially advantageous sodium polyphosphate is one in which n is about 21.

A calcium compound is also included in the refractory compositions. This calcium compound serves to adjust the $CaO:SiO_2$ ratio of the composition to within the desired range should such adjustment be necessary. Suitable calcium compounds are calcium carbonate and hydraulic cements, like calcium aluminate cement and portland cement. The hydraulic cements, especially calcium aluminate cement, are preferred. These form the best initial bond at temperatures from room temperature to about 1,800°F.

The relative proportions of the three stated components are selected to provide a relationship among the CaO, $SiO_2$ and $P_2O_5$ within certain ratio ranges. Thus, the $CaO:SiO_2$ ratio must be at least 4.5:1. While there appears to be no critical upper limit to this ratio, particularly when the $SiO_2$ content is very low, in practice it generally does not exceed about 20:1. The $P_2O_5:SiO_2$ ratio for the present compositions will also be relatively high, that is from 3:1 to 12:1. The $P_2O_5:CaO$ ratio will be, as stated, from 0.6:1 to 1.2:1; and the $CaO:(P_2O_5 + SiO_2)$ ratio is from 0.8:1 to 1.3:1. These ratios are on a weight basis.

It will be seen that the actual amounts of sodium polyphosphate and of calcium compound employed may vary somewhat and be adjusted depending upon the particular relationships, with the foregoing ranges, which are desired, and upon the physical-chemical nature of the particular magnesite and calcium compound used. In any case, neither the sodium polyphosphate nor the added calcium compound generally exceeds about 10% by weight, based on the weight of the dry composition, and each may be present in an amount from about 1 to about 8%, preferably from about 2 to about 8% by weight, based on the weight of the composition.

Optionally, up to 4% by weight of a low silica chrome ore, basis combined weight of chrome ore and calcium magnesite, can be included in the composition.

The low silica chrome ore is included with the calcined magnesite as a simple mixture of the two or as a pre-sintered grain formed by sintering the mixture, usually as a preformed body, followed by crushing and grinding. In any event the chrome ore may range up to about 40%, by weight, of the mixture. The chrome ore should be of a low-silica variety; that is, it should contain no more than about 1.5% of silica. The maximum amount of $SiO_2$ in the composition may approach 1%.

Thus, the composition of this embodiment of the invention consists essentially of: (a) calcined magnesite having a silica content below 0.7%; (b) a calcium compound; (c) a sodium polyphosphate as defined above, and (d) low silica chrome ore in an amount not over about 40% by weight, based on the combined weight of it and the calcined magnesite.

Except for the maximum $SiO_2$ content, and the fact that the above described $P_2O_5:SiO_2$; $P_2O_5:CaO$ and $CaO:(P_2O_5 + SiO_2)$ ratio ranges may not apply, what has been said above with respect to the embodiment not containing chrome ore concerning preparation of the composition, particle sizes, sodium polyphosphate, added calcium compound, and so on applies to this embodiment including chrome ore.

In preparing the composition, the stated materials are simply mixed in accordance with well-known and conventional practices and techniques. Generally, this will involve the incorporation of a tempering liquid such as water, magnesium sulfate solution, lignosulfonates and the like. The tempered batch is then molded into standard brick shapes and dried at a temperature in the range of 200°–350°F for from 4 to 24 hours prior to firing.

In accordance with the invention, the shaped chemically-bonded refractory mass is fired at temperatures from 2,500° to 3,200°F to provide inter alia improved hot compressive load deformation properties. The firing can take place in conventional commercial kilns, such as a tunnel kiln, or a bee-hive kiln.

As used herein, the term "firing" refers to heating a refractory shape to a predetermined temperature, holding the refractory shape at that predetermined temperature for a period of time, usually 1 to 16 hours and then subsequently cooling the refractory shape.

The firing can be conducted at temperatures in the range 2,500° to 2,800°F, significantly below the usual firing temperature for direct-bonded brick, to produce a refractory product that possesses improved hot compressive and transverse load resistance, improved compressive creep behavior, and thermal spalling resistance. Higher firing temperatures in the range 2,800° to 3,200°F tend to produce products which progressively improve in hot compressive load deformation resistance and long term creep resistance under compression.

By correlating the selection of MgO content with the selected firing temperature, it is possible to minimize or even eliminate dimensional changes in the refractory shapes, during firing. Generally, to achieve this dimensional stability for firing temperatures from 2,500° to 3,200°F, the MgO content should be selected on an inversely proportional basis to be from 60 to 95%, that is the MgO content for a 3,200°F firing temperature should be 60% by weight. If the selected firing temperature is 2,850°F, the midpoint of the temperature range, the MgO content should also be at about the midpoint of the MgO range if absolute dimensional stability is desired.

For a clearer understanding of the invention, specific examples of it are set forth below. These examples are merely illustrative and are not to be understood as limiting the scope of the invention. All percentages listed in the specification and claims are weight percentages unless otherwise listed.

EXAMPLES 1–3

Dead-burned magnesite of conventional grain sizing (60% —6 +35 mesh and 40% —48 mesh) is mixed with a sodium polyphosphate, a calcium-containing additive and a tempering liquid according to the procedures taught in U.S. Pat. No. 3,522,063. The mixture is molded into standard sized brick under 12,000 psi pressure, and dried. The magnesite has the following composition:

| | |
|---|---|
| 0.3% | $SiO_2$ |
| 2.7% | CaO |
| 5.0% | Oxides of Fe, Al, etc. |
| 92.0% | MgO |

The properties of this chemically-bonded brick are determined by standard methods used in the industry with the results listed in Table I, under the heading "Example 1," and serve as a control.

Brick of the same batch formulation are burned in a commercial tunnel kiln to 2,800°F, and their properties are also determined. The results are listed in Table I, under the heading "Example 2."

More brick of the same composition are burned in a high temperature commercial tunnel kiln at 3,150°F. The properties of these bricks are determined and listed in Table I, under the heading "Example 3."

TABLE I

|  | Ex. 1 | Ex. 2 | Ex. 3 |
|---|---|---|---|
| Firing Change, Vol.-% | N.A. | −1.1 | −1.2 |
| Bulk Density, g/cc | 2.94 | 2.98 | 2.94 |
| Open Pores, % | 17.0* | 16.0 | 15.3 |
| Hot Modulus of Rupture at 2700°F, psi | 2840 | 2330 | 1265 |
| Hot Load Deformation, % (5 Hrs. at 3100°F) | 3.0 | 1.8 | 0.7 |
| Reheat Change, Vol.-% (3100°F) | −1.0 | −1.1 | N.D. |

*After 2000°F

The results reported in Table I show that the brick fired in accordance with the invention exhibit significantly improved hot load deformation. While the hot modulus of rupture is lowered by firing in accordance with this invention, nevertheless the resultant hot modulus is still greater than that of commercial high fired "direct bonded" bricks.

EXAMPLES 4–6

Brick of 75% MgO content are made according to U.S. Pat. No. 3,522,063 using dead-burned magnesite described above and low silica chrome ore concentrates, analyzing (by weight)

| 1.2% | $SiO_2$ |
| 25.4% | $Fe_2O_3$ |
| 16.2% | $Al_2O_3$ |
| 46.1% | $Cr_2O_3$ |
| 0.6% | CaO |
| 10.5% | MgO |

Properties of the chemically-bonded brick are determined by standard methods and are listed in Table II under the heading "Example 4" and serve as a control.

Brick of the same composition are burned at 2,800°F and 3,150°F and their properties are listed in Table II as Examples 5 and 6, respectively.

TABLE II

|  | Ex. 4 | Ex. 5 | Ex. 6 |
|---|---|---|---|
| Firing Change, Vol.-% | N.A. | +0.6 | −0.3 |
| Bulk Density, g/cc | 3.07 | 3.08 | 3.02 |
| Open Pores, % | 16.6 | 16.5 | 16.3 |
| Hot Modulus of Rupture at 2700°F, psi | 2585 | 1850 | 1190 |
| Hot Load Deformation, % (5 Hrs. at 3100°F) | 2.4 | 1.5 | 0.5 |
| Reheat Change, Vol.-% (3100°F) | −0.8 | −1.2 | N.D. |

Again, the brick produced in accordance with this invention (Examples 5 and 6) exhibited significantly better hot load deformation properties. While the hot modulus of rupture is lowered by firing in accordance with this invention, nevertheless the resultant hot modulus is still greater than that of commercial high fired "direct bonded" bricks.

EXAMPLES 7–8

Brick of the 60% MgO class are made according to U.S. Pat. No. 3,522,063 using the same magnesite and chrome ore as described in Examples 4–6. The chemically-bonded brick are tested with the results listed in Table III under the heading "Example 7."

The same brick are fired in a commercial bee-hive kiln at 2,600°–2,650°F. The results of testing are listed in Table III under the heading "Example 8."

TABLE III

|  | Example 7 | Example 8 |
|---|---|---|
| Firing Change, % | N.A. | +0.3** |
| Bulk Density, g/cc | 3.18 | 3.19 |
| Open Pores, % | 17.0* | 15.9 |
| Hot Moduulus of Rupture at 2700°F, psi | 1610 | 1170 |
| Hot Transverse Strength (75 psi) Failure Temperature, °F | 2670 | 2790+ |
| Hot Load Deformation, % (5 Hrs. at 3100°F) | 3.7 | 2.6 |
| Hot Creep Deformation, % (50 Hrs., 2900°F) | 5.5 | ca. 3.0 |
| Prism Spalling Test, Cycles to Failure | 40+ | 40+ |
| Slag Erosion Test % Area Lost | 6.7 | 7.2 |

* After 2000°F.
** Firing change after a 3450°F burn was −0.2%.

As is apparent from Table III, the brick prepared in accordance with the present invention exhibit significantly improved hot transverse strength, hot load deformation, and hot creep deformation without lowering spalling resistance or slag erosion.

In comparison with the brick of Example 8, commercial high-fired, "direct bonded" brick show lower hot modulus strengths, slightly lower spalling resistance, slightly higher porosity, hot transverse strength, and hot load deformation, and deeper densification in the same slag erosion test.

Some modification is possible in the selection of particular materials employed as well as in the amounts thereof. The inclusion of additives which do not deleteriously alter the advantageous characteristics of the present composition in a material way is also possible without departing from the scope of the present invention.

What is claimed is:

1. In a process for making a basic refractory shape in which (a) calcined magnesite having a silica content below 0.7%; (b) a calcium compound selected from the group consisting of calcium carbonate and a hydraulic cement; (c) a sodium polyphosphate having the formula:

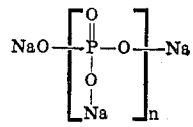

where $n$ is an integer from 4 to 100; and (d) low silica chrome ore in an amount up to 40%, by weight, thereof based on the combined weight thereof with said calcined magnesite, in proportions to provide, in said mixture, a SiO₂ content below 1% and a CaO:SiO₂ ratio of at least about 4.5:1, said calcium compound and said sodium polyphosphate each being present in an amount of from about 1% to about 10%, by weight, based on the weight of the composition, are mixed and then formed under pressure into a refractory shape, the improvement comprising firing the refractory shape at a temperature of 2,800° to 3,200°F prior to use.

2. The improved process of claim 1 in which the refractory shape is fired at 2,800° to 3,200°F for from 1 to 16 hours.

3. The improved process of claim 1 in which the refractory shape is dried at temperatures in the range of 200°F to 350°F for 4 to 24 hours prior to firing.

4. In a process for making a basic refractory shape in which (a) calcined magnesite having a silica content below 0.7%; (b) a calcium compound selected from the group consisting of calcium carbonate and a hydraulic cement; and (c) a sodium polyphosphate having the formula:

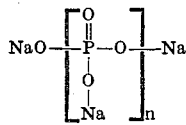

where *n* is an integer from 4 to 100, in proportions to provide, in the resulting mixture, a SiO₂ content below 0.7%, a CaO:SiO₂ ratio of at least about 4.5:1, a P₂O₅:-SiO₂ ratio of from about 3:1 to about 12:1, a P₂O₅:CaO ratio of from about 0.6:1 to about 1.2:1, and a CaO:(P₂O₅ + SiO₂) ratio of from about 0.8:1 to about 1.3:1, said calcium compound and said sodium polyphosphate each being present in an amount of from about 1% to about 10% by weight, based on the weight of the composition, are mixed and then formed under pressure into a refractory shape, the improvement comprising firing the refractory shape at a temperature of 2,800°F. to 3,200°F prior to use.

5. The improved process of claim 4 in which the refractory shape is fired at 2,800°F to 3,200°F for from 1 to 16 hours.

6. The improved process of claim 4 in which the refractory shape is dried at temperatures in the range of 200°F to 350°F for 4 to 24 hours prior to firing.

7. The improved process of claim 1 in which the SiO₂ content of the mixture is below 0.5%, and the MgO content of the mixture is between 60 to 95%, and the firing temperature is selected in the range of 2,500° to 3,200°F as an inverse function of the MgO content.

8. The improved process of claim 1 in which the firing temperature is selected to be above 2,850°F. and in which the selection of the MgO content of the refractory shape is correlated with the firing temperature selected, and the MgO content selected varies in an inversely proportional manner within the range of 60 to 77.5% for firing temperatures in the range of 2,850°F. to 3,200°F.

* * * * *